(12) United States Patent
Dolgin et al.

(10) Patent No.: US 9,581,018 B2
(45) Date of Patent: Feb. 28, 2017

(54) SYSTEM AND METHOD FOR DETERMINING SOIL CHARACTERISTICS AND DRILLING INSTABILITY DURING HORIZONTAL DIRECTIONAL DRILLING

(71) Applicant: Raytheon Company, Waltham, MA (US)

(72) Inventors: Benjamin P. Dolgin, Newington, VA (US); William G. Suliga, Manassas, VA (US); Thomas G Pepin, Warrenton, VA (US); John T. Ishibashi, Burke, VA (US); Michael A. Toreno, Herdon, VA (US); James A. Nalasco, Fairfax, VA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 14/921,556

(22) Filed: Oct. 23, 2015

(65) Prior Publication Data

US 2016/0108726 A1 Apr. 21, 2016

Related U.S. Application Data

(62) Division of application No. 13/170,273, filed on Jun. 28, 2011, now Pat. No. 9,181,791.

(51) Int. Cl.
| | |
|---|---|
| *E21B 7/06* | (2006.01) |
| *G01V 11/00* | (2006.01) |
| *E21B 49/00* | (2006.01) |
| *E21B 44/00* | (2006.01) |
| *E21B 47/024* | (2006.01) |
| *E21B 7/04* | (2006.01) |
| *E21B 47/09* | (2012.01) |

(52) U.S. Cl.
CPC ............ *E21B 49/003* (2013.01); *E21B 7/046* (2013.01); *E21B 44/00* (2013.01); *E21B 47/024* (2013.01); *E21B 47/09* (2013.01); *G01V 11/002* (2013.01); *E21B 7/06* (2013.01); *E21B 7/062* (2013.01)

(58) Field of Classification Search
CPC .......... E21B 7/061; E21B 7/062; E21B 7/067; E21B 47/04
USPC ....................................................... 702/9, 11
See application file for complete search history.

(56) References Cited

U.S. PATENT DOCUMENTS

| | | |
|---|---|---|
| 5,193,628 A | 3/1993 | Hill, III et al. |
| 7,584,808 B2 | 9/2009 | Dolgin et al. |

(Continued)

*Primary Examiner* — Gregory J Toatley, Jr.
*Assistant Examiner* — Michael Dalbo
(74) *Attorney, Agent, or Firm* — Renner, Otto, Boisselle & Sklar, LLP

(57) ABSTRACT

Disclosed is a system and method for horizontal directional drilling (HDD). The system and method utilize predictive algorithms to both characterize the soil within the borehole and to quantify instability within the drillstring. The soil characteristics are represented by a soil coefficient ($\alpha$) which relates the curvature of the borehole with the length of thrust of the drill rig as well as by comparison of thrust while thrusting with torque while drilling. The value of ($\alpha$) is obtained by comparison of the historical orientation of the drilling head over the length of the borehole and the borehole shape as determined by an arbitrary navigation sensor. Drillstring instability is determined as a function of historical thrust and torque efficiencies and windup over the length of the borehole.

6 Claims, 8 Drawing Sheets

(56) References Cited

U.S. PATENT DOCUMENTS

| | | | |
|---|---|---|---|
| 2006/0157278 A1* | 7/2006 | Dolgin | E21B 47/022 |
| | | | 175/45 |
| 2006/0162962 A1* | 7/2006 | Koederitz | E21B 49/003 |
| | | | 175/27 |
| 2006/0219438 A1* | 10/2006 | Moore | E21B 47/122 |
| | | | 175/50 |
| 2009/0062804 A1* | 3/2009 | Runquist | E21B 44/02 |
| | | | 606/80 |
| 2009/0219438 A1 | 9/2009 | Muto | |
| 2009/0283323 A1 | 11/2009 | Quernheim et al. | |
| 2009/0319241 A1* | 12/2009 | Samuel | E21B 7/04 |
| | | | 703/10 |

\* cited by examiner

SYSTEM AND METHOD FOR DETERMINING SOIL CHARACTERISTICS AND DRILLING INSTABILITY DURING HORIZONTAL DIRECTIONAL DRILLING

CROSS REFERENCE TO RELATED APPLICATION

This is a divisional application of U.S. patent application Ser. No. 13/170,273, filed Jun. 28, 2011, which is hereby incorporated by reference in its entirety.

GOVERNMENT LICENSE RIGHTS

This invention was made with Government support under Contract No. 2005 O155160 000. The Government has certain rights in the invention.

TECHNICAL FIELD

This disclosure relates to a system and method for horizontal directional drilling. More specifically, this disclosure relates to a system and method whereby soil within a borehole can be characterized and instability within the drillstring can be predicted.

BACKGROUND OF THE INVENTION

The field of horizontal direction drilling (HDD) has witnessed many advancements over the years. HDD has been widely used to create non-vertical wells in oilfields, to install and repair utility lines, and in various types of mining. HDD permits access to areas that would be inaccessible by conventional vertical wells. HDD also allows multiple well-heads to be grouped together and also permits relief wells to be more easily made. Despite the many advantages to HDD, there are many significant disadvantages.

One significant drawback is the frequency with which drillstrings become unstable. Drillstring instability can manifest itself in a variety of ways, including, but not limited to, loss of directional control, loss of angular control, loss of forward movement, and buckling. Drillstring instability can severely limit the range of HDD operations. If too high a thrust is applied the drilling head may stop and the drillstring may buckle and become locked into the ground. Drillstring instability may also occur when exceeding the maximum curvature of the drillstring. Regardless of the cause, the result is the same. The operator must back out the drillstring, or worse yet, the drillstring must be excavated. As a consequence, operators of HDD rigs spend years developing the "feel" necessary to determine when a drillstring is potentially becoming unstable.

Still yet other problems result from "cross-bore," or the drilling through an existing gas pipe or utility line. These cross-bore incidents reflect the fact that HDD operations are conducted in the blind. These cross-bore incidents are often the result of poor mapping of utility and/or gas lines. Proximity sensors are theoretically possible but are not practical due to cost considerations. Additionally, maps of underground utilities are notoriously unreliable and outdated. The consequences of cross-bore events can be costly and, in some instances, fatal.

As a result of the foregoing, efforts have been made over the years to accurately determine the position of the drilling head during HDD operations. One such effort is described in U.S. Pat. No. 5,193,628 to Hill, III et al. Hill discloses a position determining system. The system and method are termed "POLO," or POsition LOcation technology. The system successively and periodically determines the radius of curvature and azimuth of a portion of a drill pipe from axial strain measurements made on the outer surface of the drill pipe. Using these determinations, the system constructs on a segment-by-segment basis, circular arc data representing the path of the borehole. The location of the drilling head can also be obtained. Yet another effort is described in U.S. Pat. No. 7,584,808 to Dolgin et al. Dolgin discloses a centralizer based survey and navigation system (CSN). The system is designed to provide borehole or passageway position information via displacement sensors, centralizers, an odometer, a borehole initialization system, and a navigation algorithm implementing processor.

Although these position determining systems achieve their own particular objectives there still exists a need to determine potential drillstring instability during HDD operations. There also exists a need to provide a system whereby soil characteristics can be determine during HDD operations. A further need exists to tell drillstring operators when an old bore, or disturbed soil around an old bore, is encountered. The system and method disclosed herein are aimed at fulfilling these and other needs.

SUMMARY OF THE INVENTION

The disclosed system has several important advantages. For example, it provides drillstring behavior and soil characterization via predictive algorithms.

A further advantage is provided by a system wherein the maximum rate of stable drillstring penetration can be determined.

The disclosed system also provides a means for quantifying when the drillstring is approaching an instability point, thereby eliminating the need for the drillstring to be operated by "feel."

Yet another advantage is realized by a method for simultaneously comparing both loads and orientations at the drill rig and the drilling head.

A further advantage is the ability to provide algorithms to predict drilling head position based upon a history of drilling head orientation and the length of the drillstring.

Still yet another advantage is the ability to tell HDD operators when an old bore is encountered or when the disturbed soil around an old bore is encountered.

The disclosed method also predicts drilling head position based upon a history of drilling head orientations and the length of the drillstring within the borehole.

Another advantage is realized in determining how close a drillstring is to a point where no more advance is possible, how much load a drillstring can tolerate without becoming unstable, and how to manage the drillstring loads and rates of advance to move the drillstring away from instability.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference characters refer to similar parts throughout the several views of the drawings.

DETAILED DESCRIPTION OF THE DRAWINGS

The present disclosure relates to a system and method for horizontal directional drilling (HDD). The system and method utilize predictive and learning algorithms to both characterize the soil within the borehole and to quantify instability within the drillstring. The soil characteristics are represented by a soil coefficient ($\alpha$), which is a function of the historical orientation of the drilling head over the length of the borehole. Drillstring instability is determined as a function of historical thrust and torque efficiencies over the length of the borehole.

Figure 1:
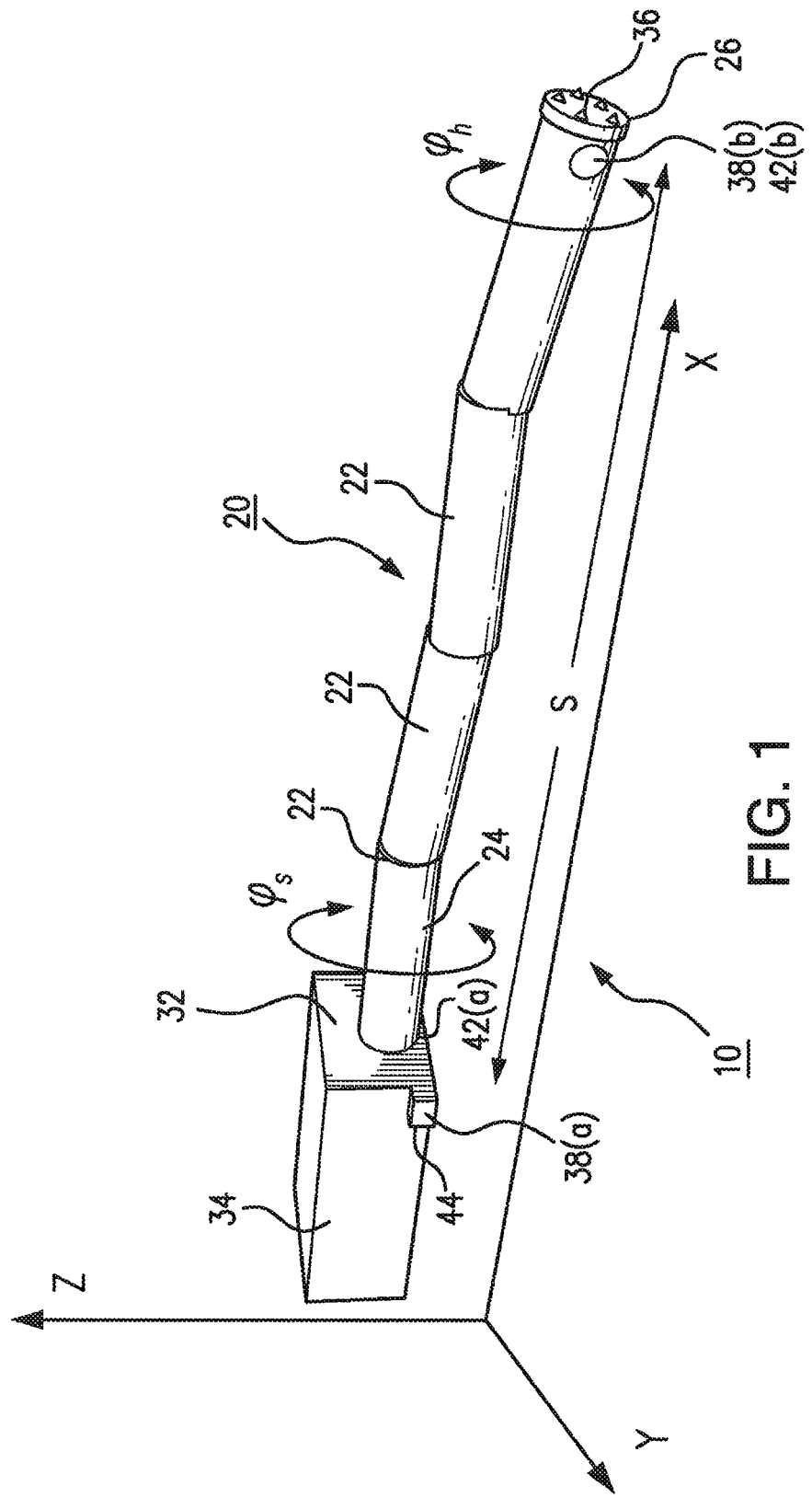
FIG. 1 is a perspective view of a drilling assembly in accordance with the disclosed system.

FIG. 1 illustrates the horizontal directional drilling system 10 that is employed in carrying out the disclosed method. The system includes an elongated drillstring 20 adapted to extend a distance underground within a borehole. Drillstring 20 is made up of a number of individual segments 22. Additional segments can be added in a sequential fashion as the borehole is extended. Segments 22 also provide a degree of flexibility and allow the drillstring to curve and/or bend along its length. This permits the direction and orientation of the borehole to be altered during drilling. FIG. 1 illustrates the drillstring in an X-Y-Z Cartesian coordinate system, with "s" denoting the overall length of drillstring 20. Drillstring 20 is defined by proximal and distal ends (24 and 26, respectively), at opposing ends of segments 22. Proximal end 24 of the drillstring is advanced by a thruster 32, which is a part of a drilling rig 34. Drilling rig 34 may also include rotary equipment and/or a mud pump. A conventional HDD drilling head 36 is positioned at distal end 26 of drillstring 20. As is known in the art, drilling head 36 includes toothed cutting face for creating the borehole through various soil types. Both drilling head 36 and the drilling rig 34 include a series of load cells 38 and navigational sensors 42. In one particular embodiment, first and second load cells (38(a) and 38(b)) and first and second navigational sensors (42(a) and 42(b)) are included. Drilling rig 34 additionally includes an odometer 44. Steering mechanisms may also be included with rig 34 to introduce an asymmetry to the drilling head 36. As will be appreciated by those skilled in the art, steering mechanisms may include a duck bill bit or variations thereof. The function of these components is described hereinafter.

Figure 2:
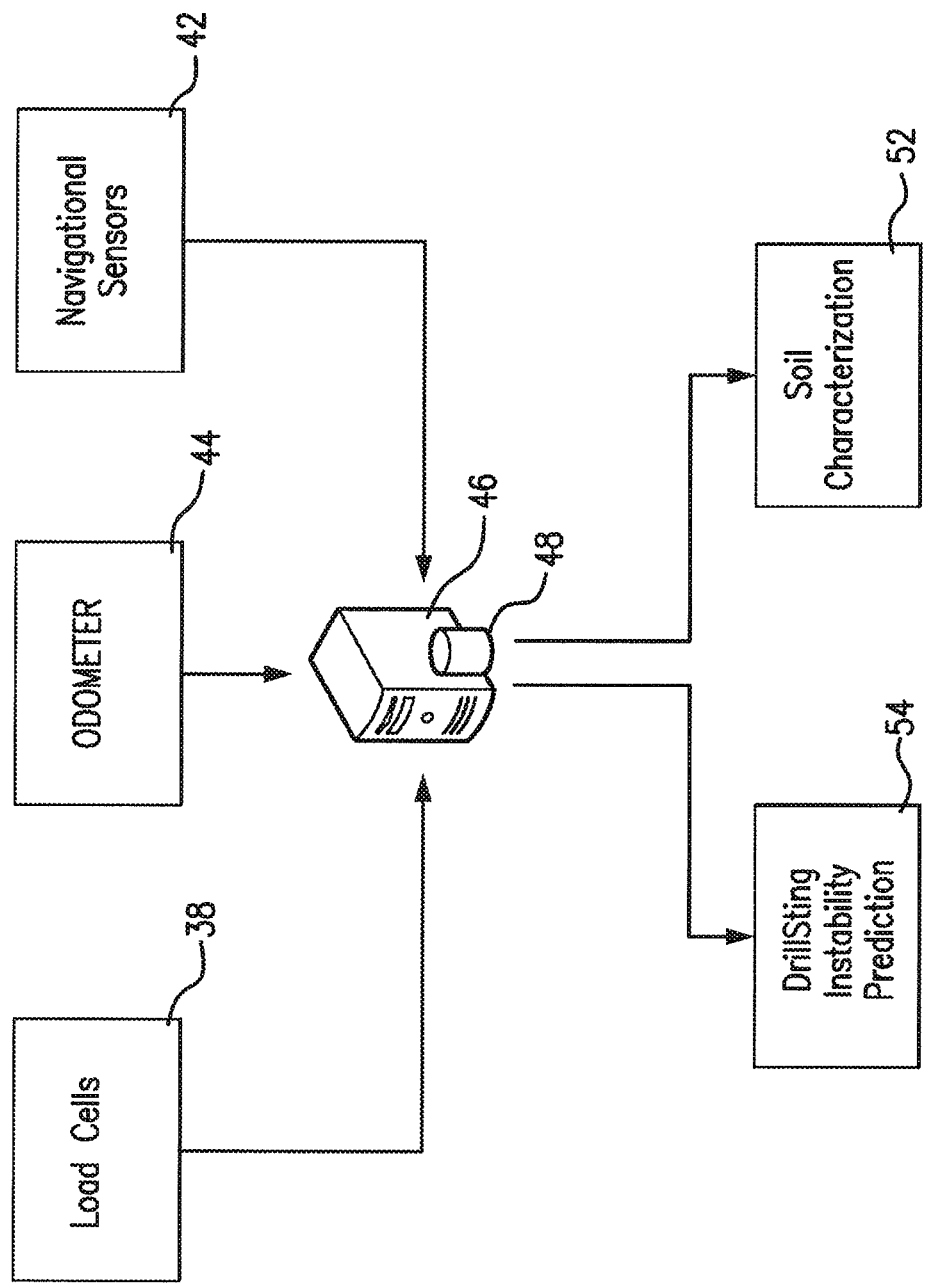
FIG. 2 is a diagram illustrating the components associated with the disclosed system.

FIG. 2 is a diagram illustrating the functional relationship of the various components of system 10. Specifically, data from load cells 38, navigational sensors 42 and the odometer 44 are delivered to a computer 46 via a communications subsystem. As known in the art, the communications subsystem can be a wireless or wireline network. Computer 46 can either be on-board drilling rig 34 or at an off-site location. A look up table of experimentally determined parameters can be stored in an associated database 48. Such parameters can be collected from previous drilling operations. Data from the navigational sensors 42 and odometer 44 is provided to computer 46 in real-time, or near real-time, and used in determining soil characteristics via module 52. Likewise, data from load cells 38 and odometer 44 can be used in predicting future drillstring instability via module 54. Both determinations are made via predictive algorithms and with reference to the lookup table of experimentally determined parameters. Alternately, the computer may analyze drilling parameters and look for sharp deviations from the average values established during earlier parts of the bore.

In a preferred but non-limiting embodiment, first and second load cells (38(a) and 38(b)) are included. These load cells 38 can be conventional strain gauges or piezoelectric load cells. The first load cell 38(a) is operatively coupled to the drilling rig 34 and the second load cell 38(b) is operatively positioned adjacent drilling head 36. The preferred embodiment also utilizes two navigational sensors (42(a) and 42(b)). These may be inertial sensors, and may include accelerometers, inclinometers, gyroscopes, magnetometers, odometers, POLO sensors, or any other state of the art sensors. One of them, navigational sensor 42(b), is positioned adjacent drilling head 36, the other a first navigational sensor 42(a), may be located somewhere else on the drillstring. Odometer 44 can be a conventional encoder for detecting the length of drillstring 20 as well as its rate of advance. Other devices can optionally be used for detecting the length of drillstring 20. These devices include means for measuring the length of the drillstring 20 not advanced and/or the use of optical or magnetic encoders along the length of drillstring 20.

The first load cell 38(a) determines the thrust applied to the proximal end 24 of drillstring 20 at drilling rig 34. This thrust is denoted as ($T_s$). The first load 38(a) cell likewise determines the torque applied to the proximal end 24 of drillstring 20 at drilling rig 34. This torque is denoted as ($Q_s$). The second load cell 38(b), which can be identical in construction to the first load cell, is operatively coupled to drilling head 36. This second load cell 38(b) determines the thrust applied to drilling head 36. This thrust is denoted as ($T_h$). The second load cell 38(b) also determines the torque applied to the drilling head 36, which is denoted as ($Q_h$). By comparing data from the first and second load cells (38(a) and 38(b)), both torque efficiency ($Q_h/Q_s$) and thrust efficiency ($T_h/T_s$) can be computed over the length of the borehole (s).

The preferred embodiment also utilizes first and second navigational sensors 42. The navigation sensor 42(b) is typically capable of tracking angle of rotation of the drillstring near the bit around the axis of the drillstring ($\phi_h$). Similarly sensor installed in or near the rig at 42(a) can provide angle of rotation of the drillstring around its axis ($\phi_s$) at point 46(a). The difference between ($w=\phi_h-\phi_s$) determines drillstring windup, which is another predictor of instability. Navigational sensors 42(a) and 42(b) can also determine the orientation of the second navigational sensor 42(b) along the ($X_s$), ($Y_s$) and ($Z_s$) axes, and the orientation of the drilling head 36 along the ($X_h$), ($Y_h$) and ($Z_h$) axes. Finally, odometer 44 is operatively coupled to drilling rig 34 and is used in determining the amount of drillstring 20 dispensed, and hence, the overall length (s) of drillstring 20. Computer 46, which can be a dedicated microprocessor, can thereafter implement predictive algorithms based upon the data from the load cells 38(a) and 38(b) and sensors 42(a) and 42(b).

As explained more fully hereinafter, a first algorithm is implemented for determining the characteristics of the soil as a function of ($Y_s$), ($Z_s$), ($Y_h$), ($Z_h$), (s), and (w). And a second algorithm is implemented for predicting instability within the drillstring as a function of ($T_s$), ($Q_s$), ($T_h$), ($Q_h$), (s), and (w).

Determining Soil Characteristics

The first algorithm is used in determining the characteristics of the soil along the borehole and near drilling head 36 as a function of the position of drilling head 36. The operator can use the first algorithm to determine whether drilling head 36 is cutting through virgin or disturbed soil, clay, sand, top soil, tar, etc. This, in turn, provides the operator with enhanced down hole situational awareness. Soil determinations are made by first determining the position of the drilling head along the (y) and (z) axes as well as the angular orientation of the drilling head ($\phi_h$). This data is accumulated over the length of the borehole (s). Thereafter, a coefficient of soil characterization ($\alpha$) is computed in accordance with the following equations, where $s_o$ is the current odometer reading and L is drillstring relaxation length.

$$\begin{cases} \frac{d^2 y}{ds^2} = \alpha \int_{s=s_0-L}^{s=s_0} \sin\varphi(s)\,ds \\ \frac{d^2 z}{ds^2} = \alpha \int_{s=s_0-L}^{s=s_0} \cos\varphi(s)\,ds \end{cases}$$

Figure 6:
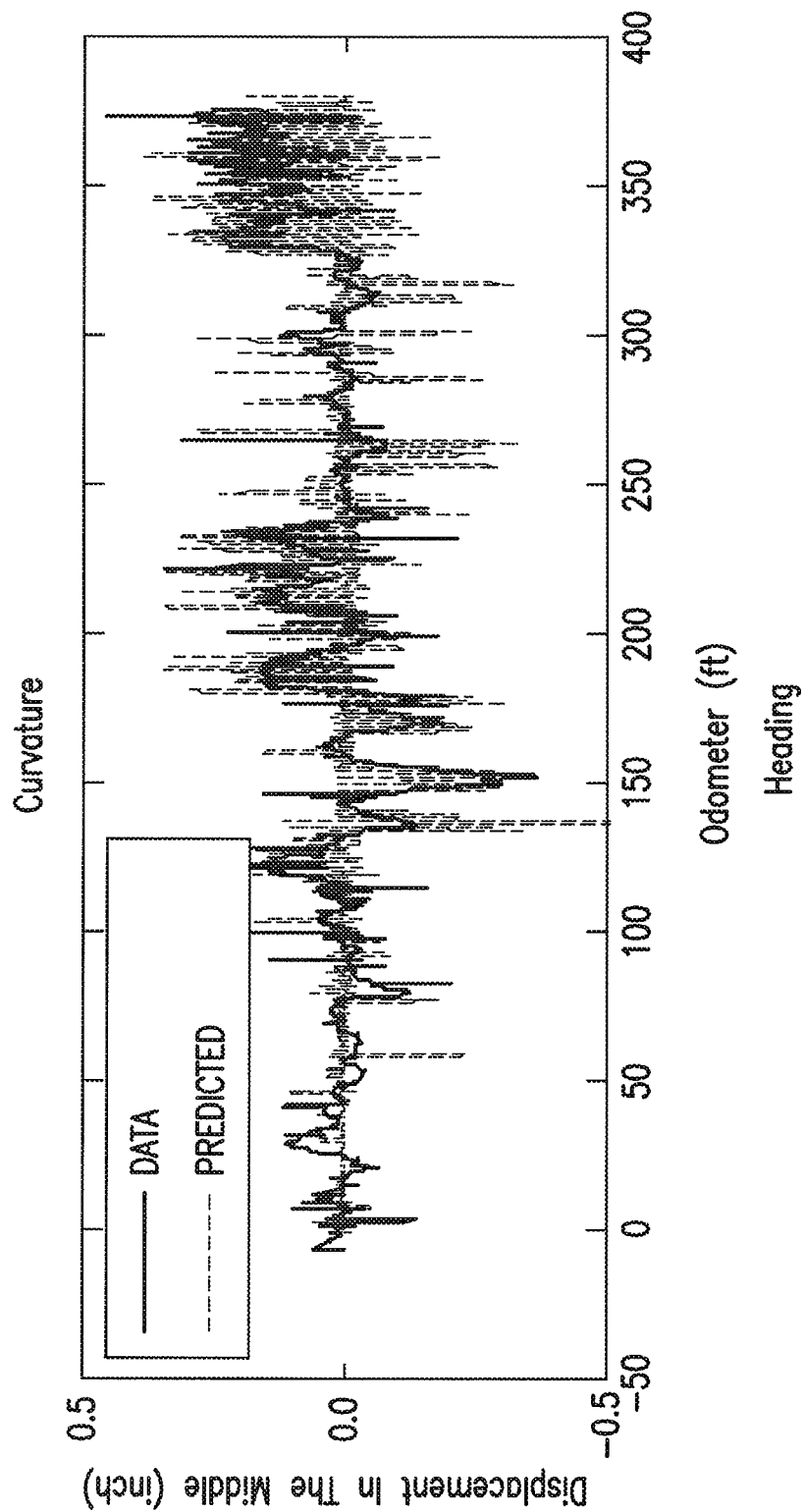
FIG. 6 is a plot of measured and predicted lateral drillstring displacement as a function of borehole length.
Figure 7:
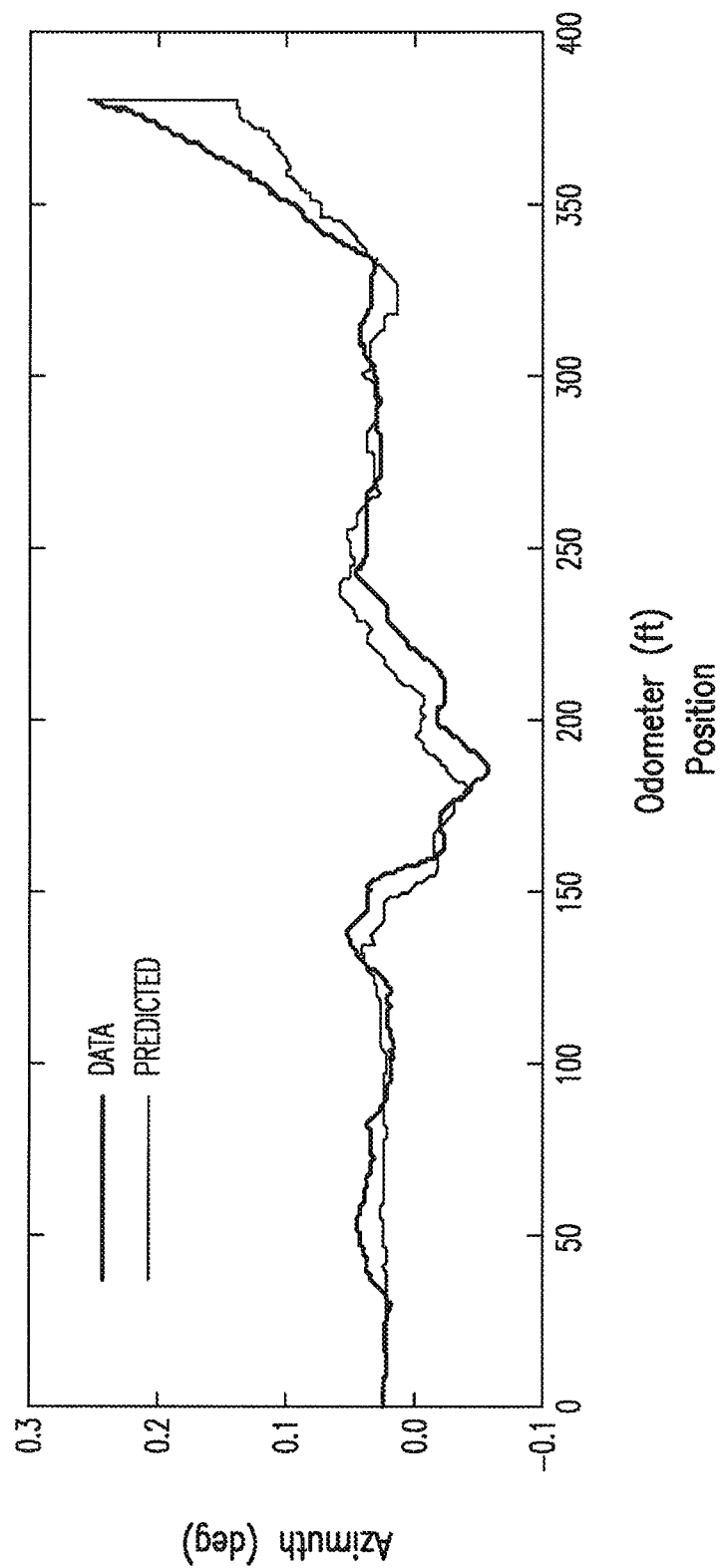
FIG. 7 is a plot of the measured and predicted azimuth of the drilling head as a function of the borehole length.
Figure 8:
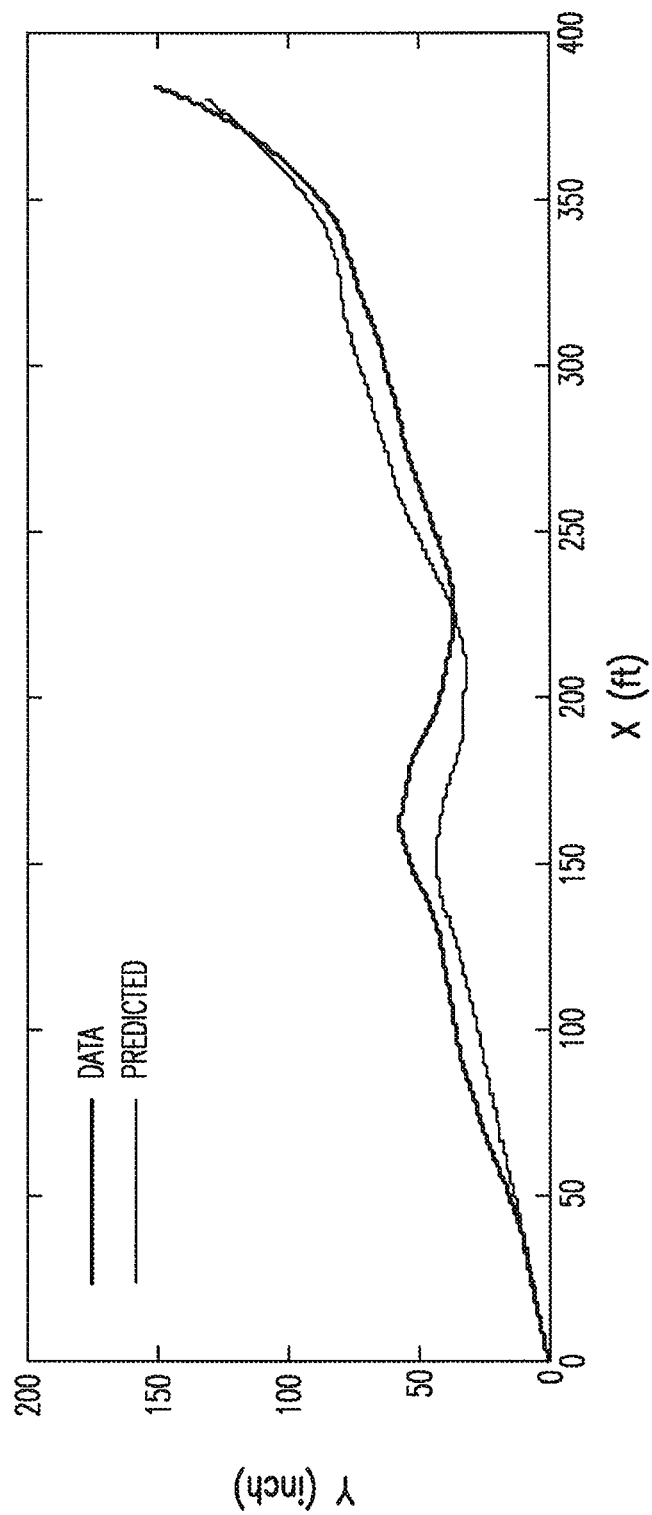
FIG. 8 is a plot of the measured and predicted position of the drilling head in a horizontal plane.

The computations are preferably carried out using a least squares fitting technique. Conversely, the above referenced formulas can be used to predict the location and orientation of drilling head 36. Namely, if the operator knows the type of soil, and its soil coefficient ($\alpha$) these same formulas can be used to determine the location and orientation of the drilling head ($Y_h$), ($Z_h$), (s), and ($\phi_h$). Graphs comparing the measured path of drilling head 36 to its predicted path are included as FIGS. 6-8.

Comparison of values of ($T_h$) while pushing and ($Q_h$) while drilling have been correlated with the values of the Cone Resistance and Friction Ratio of the cone penetrometers as identified in ASTM D3441-98, "Standard Test Method for Mechanical Cone Penetration Tests of Soil." These drillstring efficiencies are not the same as parameters identified in ASTM D3442-98. Cone Resistance and Friction Ratio of the cone penetrometers are used for soil characterization. However, with appropriate reference testing, drillstring efficiencies can be used for the same purpose.

Determining Drillstring Instability

The second algorithm can be used to quantify and/or predict drillstring instability. Namely, the method can provide drillstring operators with data sufficient to determine if the drilling is near its maximum load for given length, soil conditions and advance rate: and/or whether the maximum borehole length as been achieved. This takes much of the qualitative "feel" out of operating the drilling assembly.

In accordance with the method, the thrust ($T_s$) applied to the drillstring and torque ($Q_s$) applied to the drillstring are determined by way of a first load cell 38(a). Likewise, the thrust ($T_h$) applied to the drilling head and the torque ($Q_h$) applied to the drilling head are determined by way of the second load cell 38(b). The length of the borehole (s) is also determined by way of odometer 44.

Figure 3A:
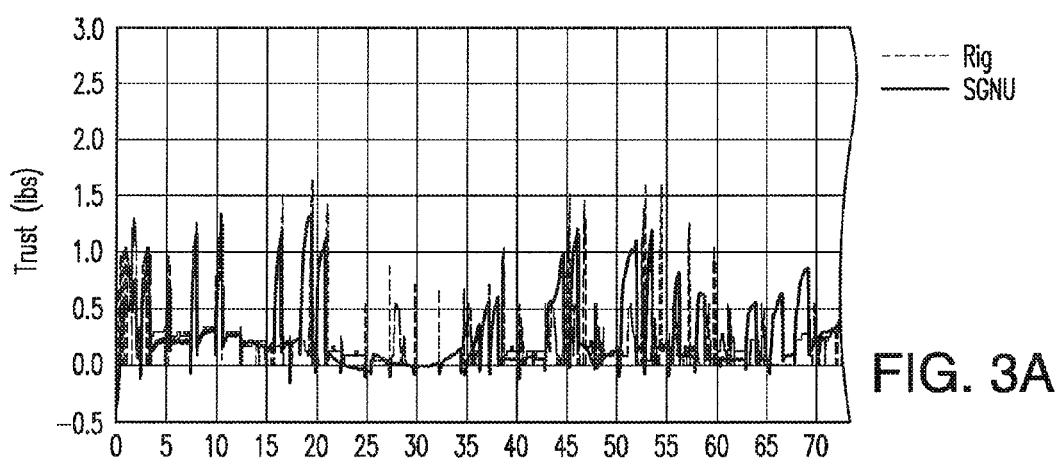
FIG. 3A is a first plot of drillstring thrust at the drilling head as a function of the borehole length.
Figure 3B:
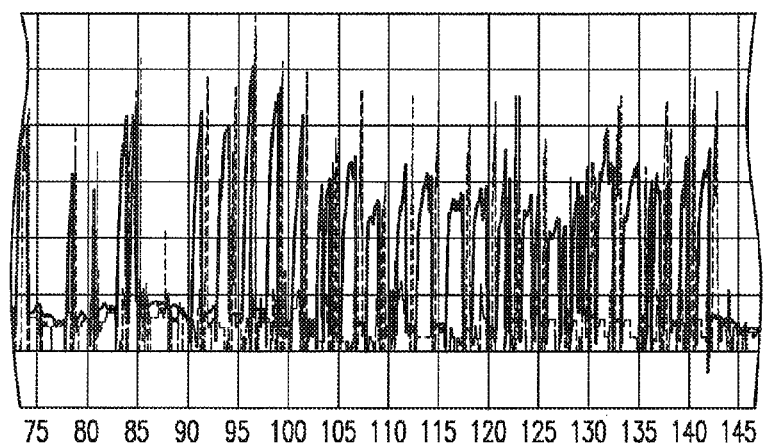
FIG. 3B is a second plot of drillstring thrust at the drilling head as a function of the borehole length.
Figure 3C:
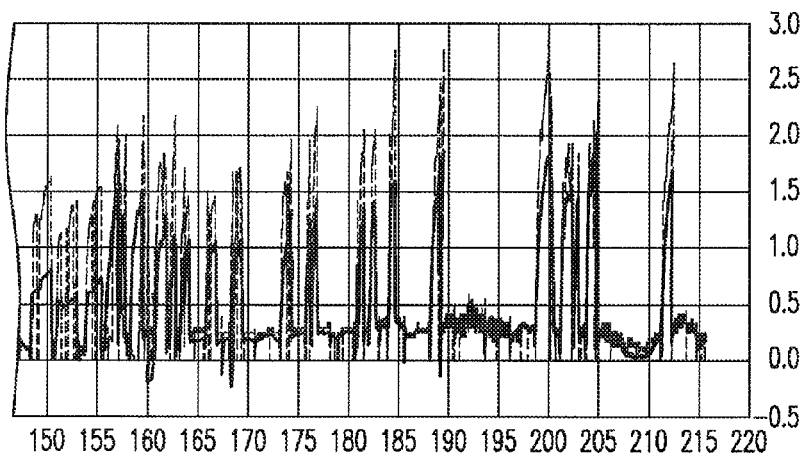
FIG. 3C is a third plot of drillstring thrust at the drilling head as a function of the borehole length
Figure 4:
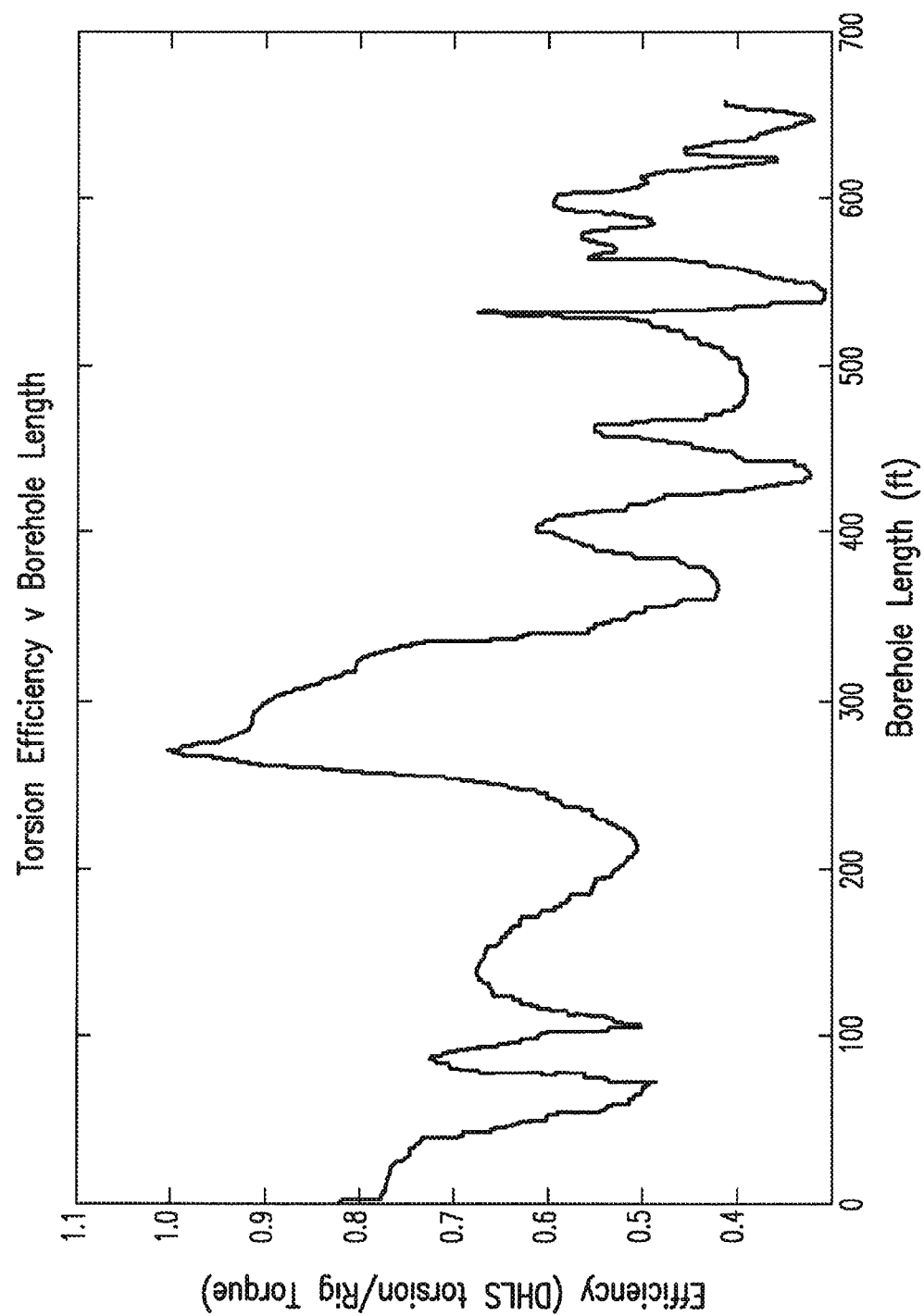
FIG. 4 is a plot of drillstring thrust efficiency as a function of borehole length.
Figure 5:
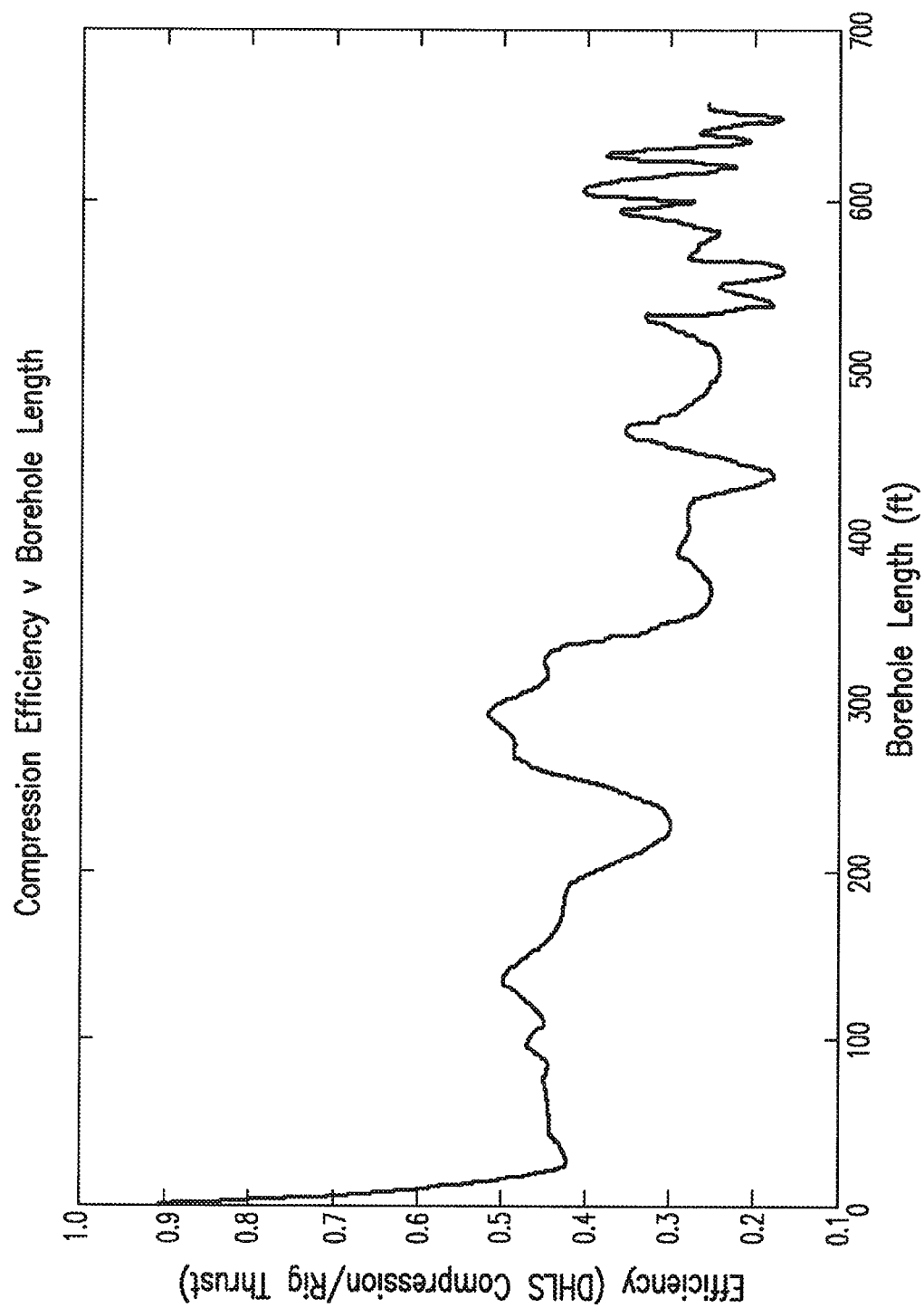
FIG. 5 is a plot of drillstring torque efficiency as a function of borehole length.

Computer 46 can plot graphs of drillstring thrust as a function of the drillstring length (s) as measured by odometer 44 (note FIGS. 3A-3C). Computer 46 can also plot graphs of thrust efficiency ($T_h/T_s$) as a function of borehole length and torque efficiency ($Q_h/Q_s$) as a function of borehole length. FIGS. 4 and 5 are representative tables for thrust and torque efficiency, respectively. In general, the danger zone of instability is determined by a simultaneous decline in both thrust and torque efficiency plots.

Predictive algorithms can be used to predict declines in the plots. A look up table is also maintained correlating drillstring instability with thrust efficiency and torque efficiency at specified borehole lengths. This look up table is created via experimental determinations. Drillstring instability can then be predicted by comparing the plots of thrust efficiency and torque efficiency against the database of experimental determinations. Based upon the current values and trends of decay of thrust and torque efficiency, the predictive algorithms and the look-up tables can estimate the maximum remaining drilling capacity in the rig. The algorithms and look-up tables can also be used to predict the maximum borehole length under given soil conditions, the rate of penetration, and thrust and torque capacities. All of this information can ultimately be used to determine: how close the drillstring is to a point where no more advance is possible; how much load the drillstring can tolerate without becoming unstable; or how to manage the drillstring loads and rates of advance to move the drillstring away from instability.

By way of the above referenced methods, drillstring operators can quantify and/or predict the following characteristics: drillstring float; drillstring friction; drillstring wind-up; drillstring buckling; drillstring stability; soils composition and soil type; instantaneous changes of soil type.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for determining soil characteristics within a borehole made via horizontal directional drilling, the method employing a drilling rig, a drillstring, and a drilling head, the method comprising the following steps:
   performing the horizontal direction drilling;
   determining the position of the drilling head along the (y) and (z) axes and the angular orientation of the drilling head ($\phi$) by way of navigational sensors positioned proximate to the drilling rig and the drilling head, respectively;
   determining the length of the borehole (s); and
   computing a coefficient of soil characterization ($\alpha$) as a function of the position of the drilling head (y, z), the angular orientation of the drilling head ($\phi$), and the length of the borehole (s), all over a drillstring relaxation length L, which is a length of thrust of the drill rig;

wherein the coefficient of soil characterization (α) is computed in accordance with the following equations:

$$\begin{cases} \dfrac{d^2 y}{ds^2} = \alpha \int_{s=s_0-L}^{s=s_0} \sin\varphi(s)\,ds \\ \dfrac{d^2 z}{ds^2} = \alpha \int_{s=s_0-L}^{s=s_0} \cos\varphi(s)\,ds \end{cases}$$

where $s_o$ is current odometer reading.

2. A method for determining soil characteristics within a borehole made via horizontal directional drilling, the method employing a drilling rig, a drillstring, and a drilling head, the method comprising the following steps:

performing the horizontal direction drilling;

determining the position of the drilling head along the (y) and (z) axes and the angular orientation of the drilling head (φ) by way of navigational sensors positioned proximate to the drilling rig and the drilling head, respectively;

determining the length of the borehole (s); and computing a coefficient of soil characterization (α) as a function of the position of the drilling head (y, z), the angular orientation of the drilling head (φ), and the length of the borehole (s), all over a drillstring relaxation length L, which is a length of thrust of the drill rig;

wherein the drillstring has proximal and distal ends;

wherein a first of the navigational sensors is located at the proximal end of the drillstring, adjacent the drilling rig, and a second of the navigational sensors is located at the distal end of the drillstring, adjacent the drilling head; and wherein the soil coefficient (α) is determined as a function of the relative orientation of the proximal and distal ends of the drillstring.

3. The method as described in claim 2, wherein the coefficient of soil characterization (α) is computed in accordance with the following equations:

$$\begin{cases} \dfrac{d^2 y}{ds^2} = \alpha \int_{s=s_0-L}^{s=s_0} \sin\varphi(s)\,ds \\ \dfrac{d^2 z}{ds^2} = \alpha \int_{s=s_0-L}^{s=s_0} \cos\varphi(s)\,ds \end{cases}$$

where $s_o$ is current odometer reading.

4. A method for detecting instability within a borehole made via horizontal directional drilling, the method employing a drilling rig, a drillstring, and a drilling head, the method comprising the following steps:

performing the horizontal direction drilling;

determining the thrust applied to the drilling head ($T_h$) and the torque applied to the drilling head ($Q_h$) by way of a load cell positioned proximate to the drilling head;

determining the thrust applied to the drillstring ($T_s$) and torque applied to the drillstring ($Q_s$) by way of a load cell positioned proximate to the drilling rig;

determining the length of the borehole (s) by way of an odometer positioned proximate to the drilling rig;

determining the angle of rotation of the drillstring $\phi_h$ and $\phi_s$ the windup of the drillstring (w=$\phi_h$-$\phi_s$) by the way of navigational sensors located at the proximal and distal ends;

generating a plot of thrust efficiency ($T_h/T_s$) as a function of borehole length, a plot of torque efficiency ($Q_h/Q_s$) as a function of borehole length, and a plot of windup w as a function of borehole length; and predicting instability within the borehole upon a simultaneous decline in $T_h/T_s$ and $Q_h/Q_s$ plots, and an increase in w plot.

5. The method as set forth in claim 4 comprising the additional steps of maintaining a database correlating drillstring instability with thrust efficiency and torque efficiency and windup at specified borehole lengths, the database being created via experimental determinations.

6. The method as set forth in claim 5 comprising the additional steps of predicting drillstring instability by comparing the plots of thrust efficiency and torque efficiency and windup against the database of experimental determinations.

* * * * *